United States Patent
Parekh

(10) Patent No.: US 10,979,563 B1
(45) Date of Patent: Apr. 13, 2021

(54) NON-RESIDENT INITIATED COMMUNICATION WITH A CONTROLLED-ENVIRONMENT FACILITY RESIDENT

(71) Applicant: Securus Technologies, Inc., Carrollton, TX (US)

(72) Inventor: Uday R. Parekh, Frisco, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 16/459,459

(22) Filed: Jul. 1, 2019

(51) Int. Cl.
*H04M 3/38* (2006.01)
*H04M 3/42* (2006.01)
*H04M 3/22* (2006.01)
*H04M 15/00* (2006.01)

(52) U.S. Cl.
CPC ..... *H04M 3/42357* (2013.01); *H04M 3/2218* (2013.01); *H04M 3/2281* (2013.01); *H04M 3/38* (2013.01); *H04M 15/85* (2013.01); *H04M 2242/14* (2013.01)

(58) Field of Classification Search
CPC ........... G08B 1/08; G08B 21/22; H04L 12/58; H04L 63/08; H04L 65/1043; H04L 69/22; H04M 1/64; H04M 3/2218; H04M 3/2281; H04M 3/38; H04M 3/42357; H04M 3/436; H04M 15/85; H04M 2242/14; H04M 3/4931; H04M 17/01; H04N 7/14; H04W 76/16; G06Q 50/01
USPC .......... 340/5.53; 379/35, 88.12, 142.05, 189, 379/211.02, 70, 88.02, 88.04, 88.16, 191, 379/196, 207.02; 455/419, 411; 709/206, 231; 726/4; 370/352, 389
See application file for complete search history.

(56) References Cited

U.S. PATENT DOCUMENTS

| | | | | |
|---|---|---|---|---|
| 5,539,812 | A * | 7/1996 | Kitchin | H04M 1/53 379/189 |
| 6,122,357 | A * | 9/2000 | Farris | H04Q 3/0045 379/201.02 |
| 6,167,119 | A * | 12/2000 | Bartholomew | H04M 3/38 379/201.02 |

(Continued)

*Primary Examiner* — Gerald Gauthier
(74) *Attorney, Agent, or Firm* — Fogarty LLP

(57) ABSTRACT

Systems and methods for initiating communication with a controlled-environment facility resident by a non-resident may employ a controlled-environment facility secure communication platform that receives an incoming communication request from a non-resident, directed to a telephone number assigned to a controlled-environment facility resident and/or a controlled-environment facility media and/or communications device associated with the resident, for a communication with the resident. The facility secure communication platform sends an event notice to the device associated with the resident or a controlled-environment facility media and/or communications terminal associated with the resident, in response to receipt of the incoming communication request. The device or terminal presents an option to accept the event notice and the controlled-environment facility secure communication platform and/or the device or terminal connects an outgoing communication from the device or terminal to a device associated with the non-resident, in response to acceptance of the event notice.

17 Claims, 3 Drawing Sheets

(56) References Cited

U.S. PATENT DOCUMENTS

| | | | | |
|---|---|---|---|---|
| 6,647,096 B1* | 11/2003 | Milliorn | .............. | H04M 3/2281 379/133 |
| 7,106,843 B1* | 9/2006 | Gainsboro | .......... | H04M 3/2281 379/191 |
| 8,976,949 B2* | 3/2015 | Torgersrud | .......... | H04M 3/4234 379/191 |
| RE46,153 E* | 9/2016 | Makagon; Petr | ... | H04L 65/1036 |
| 9,769,310 B2 | 9/2017 | Hodge | | |
| 9,990,826 B1* | 6/2018 | Hodge | ................... | G08B 21/22 |
| 10,091,350 B2 | 10/2018 | Hodge | | |
| 10,104,710 B1* | 10/2018 | Hodge | ................ | H04W 76/15 |
| 10,313,518 B1* | 6/2019 | Juvet | ................ | H04M 3/42221 |
| 10,484,648 B1* | 11/2019 | Sturges | ............... | H04M 3/4931 |
| 2005/0249209 A1* | 11/2005 | Fotta | ................. | H04Q 3/54591 370/389 |
| 2008/0043969 A1* | 2/2008 | Shi | ................... | H04M 3/42263 379/211.02 |
| 2011/0317685 A1* | 12/2011 | Torgersrud | ............. | H04L 12/66 370/352 |
| 2012/0099714 A1* | 4/2012 | Hodge | ................ | H04M 3/2281 379/88.16 |
| 2012/0262271 A1* | 10/2012 | Torgersrud | .............. | G06F 21/32 340/5.53 |
| 2013/0263227 A1* | 10/2013 | Gongaware | ............ | H04L 63/08 726/4 |
| 2014/0018059 A1* | 1/2014 | Noonan | ................ | H04W 64/00 455/419 |
| 2014/0105373 A1* | 4/2014 | Sharpe | ................ | H04M 3/4365 379/142.05 |
| 2014/0192965 A1* | 7/2014 | Almeida | ............... | H04M 3/436 379/70 |
| 2014/0282896 A1* | 9/2014 | Torgersrud | ............. | H04L 63/02 726/4 |
| 2015/0215254 A1* | 7/2015 | Bennett | ................... | H04L 51/12 709/206 |
| 2017/0149962 A1* | 5/2017 | Hodge | ................ | H04M 15/85 |
| 2017/0201623 A1* | 7/2017 | Keiser | ................ | H04M 3/436 |
| 2017/0353404 A1* | 12/2017 | Hodge | ................ | G06Q 50/01 |

\* cited by examiner

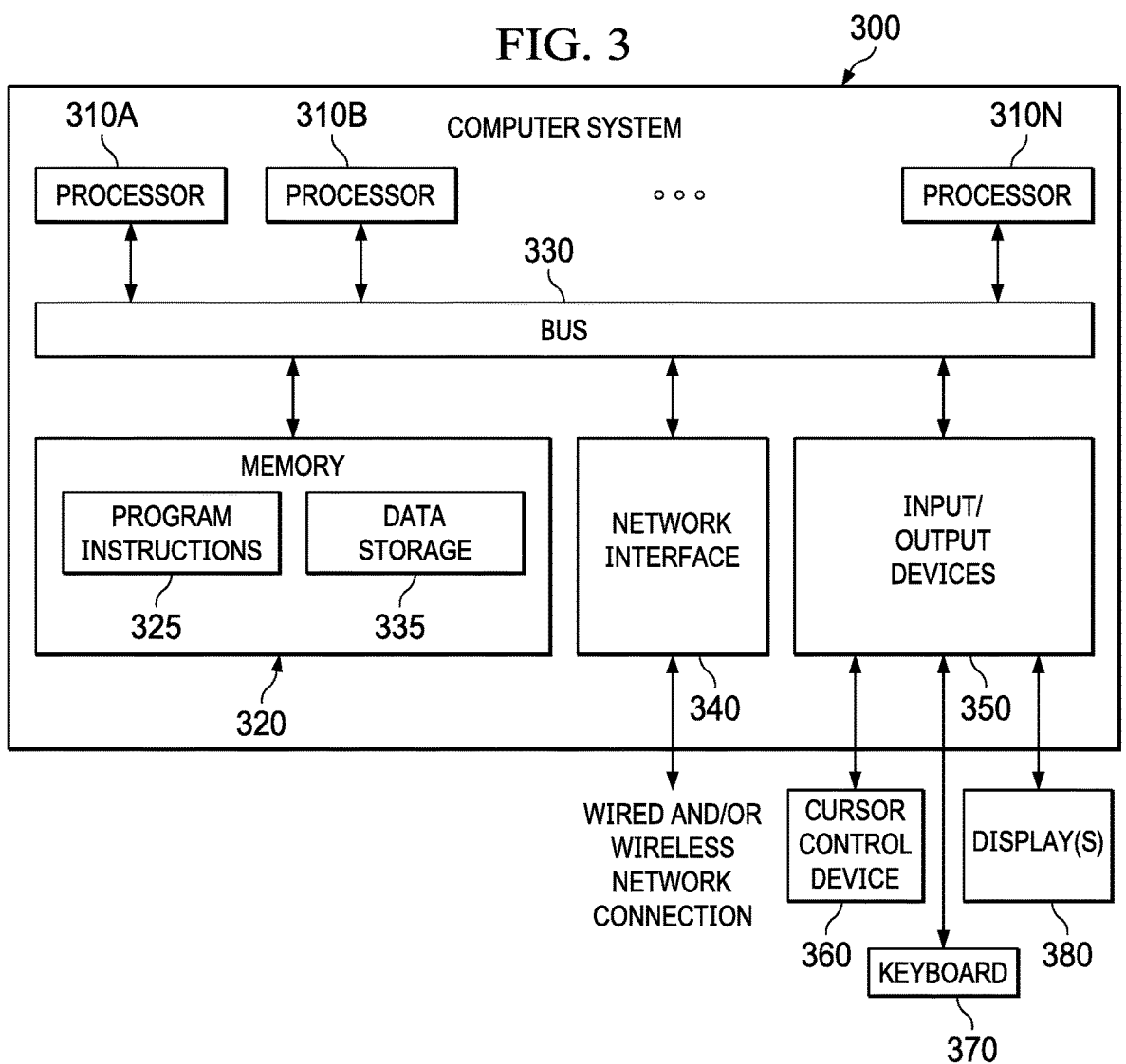

NON-RESIDENT INITIATED COMMUNICATION WITH A CONTROLLED-ENVIRONMENT FACILITY RESIDENT

TECHNICAL FIELD

The present disclosure relates generally to controlled-environment facilities, more particularly to communications with residents of controlled-environment facilities, and specifically to non-resident initiated communication with controlled-environment facility residents.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide initiation of communication with a controlled-environment facility resident by a non-resident. Therein, a controlled-environment facility secure communication platform, or the like, receives an incoming communication request from a non-resident, directed to a telephone number assigned to a controlled-environment facility resident and/or a controlled-environment facility media and/or communications device associated with the controlled-environment facility resident, for communication with the controlled-environment facility resident. The controlled-environment facility secure communication platform may provide a web interface on the non-resident device for use by the non-resident, and accept, via the web interface, the incoming communication request from the non-resident for the communication with the controlled-environment facility resident, for receipt by the controlled-environment facility secure communication platform. The controlled-environment facility secure communication platform may additionally, or alternatively, provide an application program (app) for use by the non-resident on a non-resident device, present, via the app, a user interface on the non-resident device for use by the non-resident, and accept, via the user interface, the incoming communication request from the non-resident for the communication with the controlled-environment facility resident, for receipt by the controlled-environment facility secure communication platform.

The controlled-environment facility secure communication platform, or the like, sends an event notice to the controlled-environment facility media and/or communications device associated with the resident or a controlled-environment facility media and/or communications terminal associated with the resident, in response to receipt of the incoming communication request. The controlled-environment facility media and/or communications device may be a controlled-environment facility resident media and/or communications device associated with the controlled-environment facility resident. Alternatively, or additionally, the controlled-environment facility media and/or communications device or terminal may be a controlled-environment facility media and/or communications terminal that the controlled-environment facility resident has signed onto. The controlled-environment facility media and/or communications device or terminal presents an option to accept the event notice. The event notice may prompt playing of a telephone ring alert on the controlled-environment facility media and/or communications device or terminal.

The controlled-environment facility secure communication platform and/or the controlled-environment facility media and/or communications device or terminal connects an outgoing communication from the controlled-environment facility media and/or communications device or terminal to a device associated with the non-resident, in response to acceptance of the event notice.

However, the controlled-environment facility media and/or communications device or terminal may present, in response to acceptance of the event notice, a phone dialer interface with a telephone number associated with the non-resident pre-filled on the interface, on the controlled-environment facility media and/or communications device or terminal. In such implementations, the controlled-environment facility secure communication platform, the controlled-environment facility media and/or communications device or terminal, and/or the like, may connect the outgoing communication from the controlled-environment facility media and/or communications device or terminal to the device associated with the non-resident, in response to an indication to dial the telephone number, received via the phone dialer interface.

Additionally, the controlled-environment facility secure communication platform and/or controlled-environment facility media and/or communications device or terminal may require identification information from the controlled-environment facility resident, prior to connecting the outgoing communication from the controlled-environment facility media and/or communications device or terminal to the device associated with the non-resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
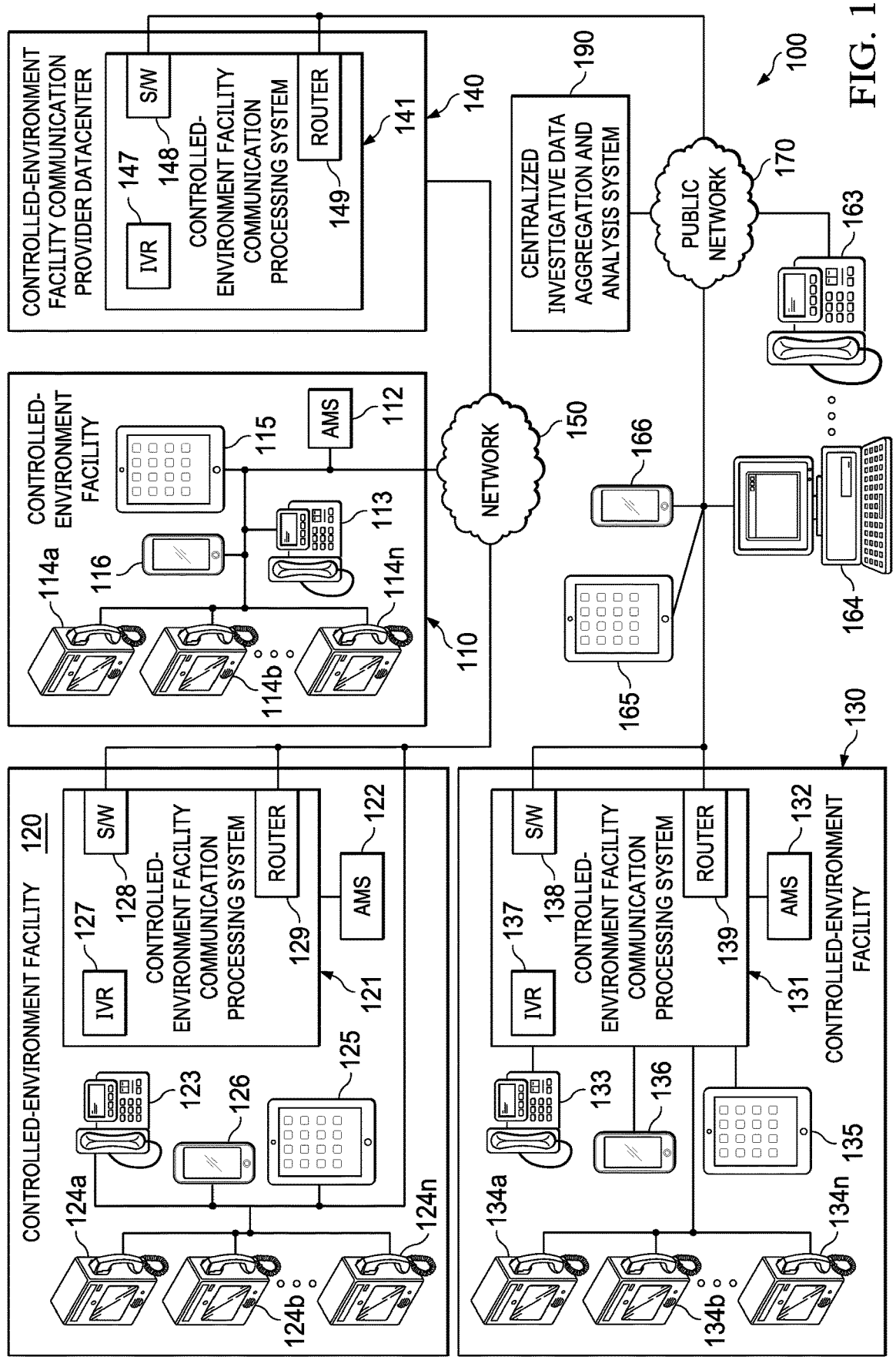
Figure 2:
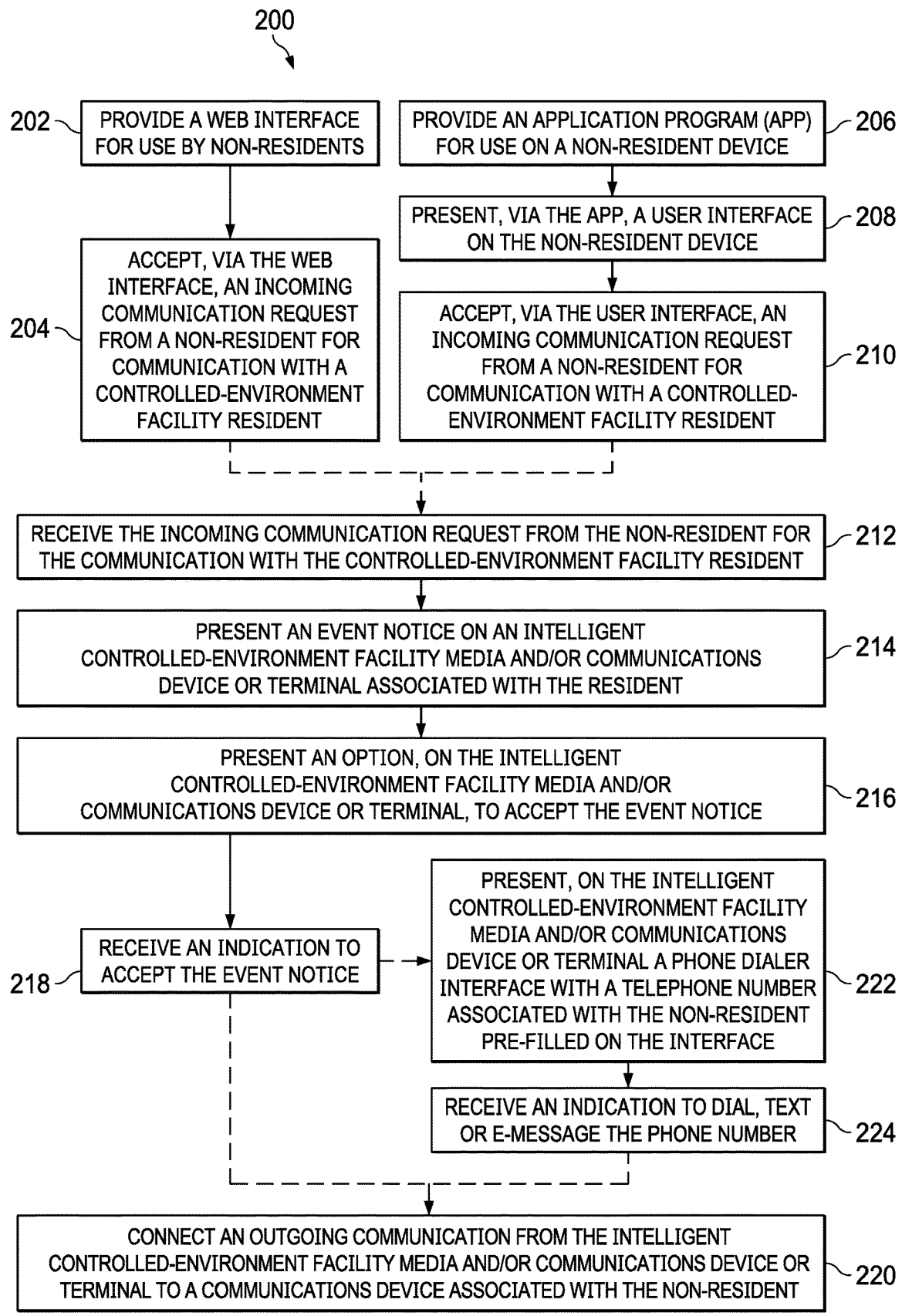

Having thus described the invention in general terms, reference will now be made to the accompanying drawings, which are not necessarily drawn to scale, and wherein:

FIG. 1 is a diagrammatic illustration of an example controlled-environment facility communications environment, wherein example embodiments of the present systems and methods for handling non-resident initiated communication with controlled-environment facility residents may be practiced, according to some embodiments;

FIG. 2 is a flowchart of an example process for handling non-resident initiated communication with controlled-environment facility residents, in accordance with some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The controlled-environment facility communications industry is geared toward outbound calls, that is, calls from a controlled-environment facility resident (e.g., a correction facility inmate), out, to a non-resident. Typically, there is no current way for friends and families to proactively contact residents. Friends and family often anxiously await calls from residents. They either have to wait on a scheduled visit or wait for the inmate to contact them. If there is an urgent matter that arises, there is typically no way for the friend and family to initiate a communication with the inmate to provide or gather information. Hence, the present systems and methods relate generally to controlled-environment facilities, more particularly to communications with residents of controlled-environment facilities, and specifically to non-resident initiated communication with controlled-environment facility residents. In other embodiments, the present systems and methods may include inmate to inmate communications. Whereby, one inmate may initiate a communication with another inmate (i.e., one inmate may place a call (i.e., an outbound call) that is an inbound call to a resident of another, or the same controlled-environment facility).

In accordance with embodiments of the present systems and methods for initiating communication with a controlled-environment facility resident by a non-resident, a controlled-environment facility secure communication platform, or the like, receives an incoming communication request from a non-resident, directed to a telephone number assigned to a controlled-environment facility resident and/or a controlled-environment facility media and/or communications device associated with the resident, for a communication with the resident. The facility secure communication platform, or the like, sends an event notice to the device associated with the resident, a controlled-environment facility media and/or communications terminal associated with the resident, or the like, in response to receipt of the incoming communication request. The device, terminal, or the like, presents an option to accept the event notice and the controlled-environment facility secure communication platform, the device, the terminal, or the like, connects an outgoing communication from the device, terminal, or the like, to a device associated with the non-resident, in response to acceptance of the event notice.

In accordance with embodiments of the present systems and methods a non-resident, such as a friend or family member, may initiate a request for a call (voice, video, text, etc.) with a controlled-environment facility resident (e.g., a correctional facility inmate). The non-resident may initiate such a request for the call to the resident via a web page, via a mobile application program (app), via phone (e.g., by dialing a telephone number assigned to the resident and/or an intelligent controlled-environment facility resident media and/or communications device of the resident). The request is, in accordance with embodiments of the present systems and methods, presented to the resident, in real-time to the resident's intelligent controlled-environment facility resident media and/or communications device, or whenever the resident logs into an intelligent controlled-environment facility media and/or communications terminal. Whereupon, the resident may act upon the inbound request and places an outbound controlled-environment facility call via a secure controlled-environment facility calling platform. For example, in accordance with embodiments of the present systems and methods the resident's intelligent controlled-environment facility resident media and/or communications device, or whenever the resident logs into an intelligent controlled-environment facility media and/or communications terminal, the terminal, may present an "accept" button, or the like, such as, a video, text, emoji, email or other acknowledgment symbol, which will place an outbound controlled-environment facility call via the secure controlled-environment facility calling platform, upon selection by the resident. The secure controlled-environment facility calling platform will process this outgoing call with rules and restrictions applicable to the resident's controlled-environment facility, as if the resident initiated the call.

Thusly, embodiments of the present systems and methods employ an indication of an inbound request, from a non-resident to a controlled-environment facility resident, and place a more-or-less industry standard outbound call, from the resident to the non-resident. Thereby, the resident has an incoming call experience, particularly when the resident receives, such as via their intelligent controlled-environment facility resident media and/or communications device, the incoming communication request in real time. To such end, when the inbound call prompts an event notice on the resident's intelligent controlled-environment facility resident media and/or communications device, or whenever the resident logs into an intelligent controlled-environment facility media and/or communications, the event notice alert sound may be a telephone ring, or the like, in accordance with various embodiments of the present systems and methods.

In some embodiments, upon the resident accepting the incoming communications request, a confirmation screen may be provided for the resident to enter a PIN and/or initiate the call back to the non-resident. To such ends, the resident may be presented a phone dialer user interface on their intelligent controlled-environment facility resident media and/or communications device with the non-resident's telephone number prefilled. In accordance with some embodiments of the present systems and methods, this (confirmation) screen may also provide the resident an opportunity to dial out to a different number.

FIG. 1 is a diagrammatic illustration of example controlled-environment facility communications environment 100, wherein example embodiments of the present systems and methods for handling non-resident initiated communication with controlled-environment facility residents may be practiced, for example with respect to multiple controlled-environment facilities 110, 120, etc., and/or a single controlled-environment facility (130) according to some embodiments. Therein, onsite communication processing system 121, 131, external centralized communication processing system 141, such as may be deployed in a controlled-environment facility communications provider data center (140), or the like may provide telephone services, videoconferencing, online chat, and other communication services to residents of respective controlled-environment facility 110, 120, 130, etc. As illustrated, in some cases, a communication processing system (121, 131) may be co-located with a controlled-environment facility (120, 130, respectively). Alternatively, as also illustrated, a communication processing system (141) may be centrally or remotely located, such as in controlled-environment facility communications provider data center 140 in whole (such as with respect to facility 110) or in part (such as with respect to facility 120). Controlled-environment facility communications provider data center 140, and hence external centralized communication processing system 141, may be connected to such facilities via a public network (e.g., the Internet) or a private network, or the like (e.g., via a secure tunneling protocol over the internet, using encapsulation) (150) and may provide communication services to such multiple controlled-environment facilities. Such controlled-environment facility communication processing systems, particularly when deployed in, or in conjunction with, a controlled-environment facility communications provider data center (140) may be referred to as a "controlled-environment facility secure communication platform," or the like. More generally, however, it should be noted that communication systems 121, 131, 141, etc. may assume a variety of forms, comprising, including and/or embodying telephony switches, such as electronic switching systems, or the like, and/or and may be configured to serve a variety of facilities and/or users, whether within, or outside of, the respective controlled-environment facility.

In some implementations, wherein the controlled-environment communication system (121, 131) is located within the controlled-environment facility (120, 130), it may have direct access to an Administration Management System (AMS) 122, 132 (or a Jail Management System (JMS) in correctional environment embodiments) for garnering information used in accordance with various embodiments of the present systems and methods. In other embodiments, where the (central) controlled-environment facility communication system (141) is located remotely with respect to the controlled-environment facility (110, 120, etc.), access to AMS (or JMS) 112, 122, etc. may (also) be obtained via a computer network such as, for example, network 150, for gathering information used in accordance with various embodiments of the present systems and methods.

In the context of a correctional facility, the respective JMS or AMS databases may also include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity). In accordance with embodiments of the present systems and methods, a telephone number may be assigned to a controlled-environment facility resident and/or a controlled-environment facility media and/or communications device associated with the controlled-environment facility resident using such an AMS, which thereafter may maintain such telephone number.

In addition to providing certain visitation and communication operations, communication processing systems 121, 131, 141, etc. and/or AMS (or JMS) 112, 122, 132, etc. may attempt to ensure that a resident's calls, video conferences, online chats, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 112, 122 or 132, or the like. In addition to PAN or PAC list(s), AMS (or JMS) 112, 122 or 132 (databases), or the like, may also store inmate or resident profile data (RPD), as well as visitation rules applicable to each inmate or resident, Communication Detail Records (CDRs), or similar records, for resident phone calls, video visitations, texts, online chats, e-messaging, or the like, included the aforementioned resident (device) telephone numbers.

Residents may use more-or-less conventional telephones 113, 123, 133, or the like to access certain communication services, under control of respective communication processing system 121, 131, 141, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use an intelligent controlled-environment facility media and/or communications terminal 114*a* through 114*n*, 124*a* through 124*n*, 134*a* through 134*n*, or the like, to place voice calls, as well as for video visitation, under control of respective communication processing system 131, 141, etc. Such an intelligent controlled-environment facility media and/or communications terminal may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent controlled-environment facility resident media and/or communications device, Intelligent Resident Device (IRD), or the like, and in a correctional institution embodiment, as an intelligent inmate media and/or communications device Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 121, 131, 141, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are generally illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IRDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, such an IRD may be "stripped-down," particularly from the standpoint of what apps are provided or allowed on the IRD, and/or connectivity afforded to the IRD. By way of example, such an IRD may employ an operating system kernel that has been rebuilt for use in such a tablet computing device in a controlled-environment facility. As a further example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility, for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on an IRD might include apps of particular interest to residents of the controlled-environment facility. For example, an IRD provided to inmates of correctional facilities, might include apps that may be of particular use to an inmate, in general, such as access to a legal research service, or of more specific interest, such as providing an inmate nearing release, access to employment searching apps or the like. Hence, such IRDs may be used to help soon to be released inmates' transition. For example, the IRD may be used to communicate with a future employer, or the like. As such, IRDs may be sponsored, or otherwise subsidized by organizations or companies, assisting with the transition of inmates into society. As noted, in accordance with embodiments of the present systems and methods, IRDs may be used to communicate with others, such as through phone calls, video calls, or the like.

For a resident to initiate an outgoing communication, the resident may initiate telephone services by lifting the receiver on telephone 113, 123,133, etc. or IFD 114, 124, 134, etc. and/or otherwise initiating a call, such as by launching an app on IRD 115, 125, 135, 116, 126, 136, etc. At which time, the resident may be prompted to provide a PIN, other identifying information or biometrics. Interactive voice response (IVR) unit 127, 137 or 147, which may be integrated into communications processing system 121, 131 and/or 141, as illustrated, may generate and play a prompt or other messages to the resident. Under the control of communication processing system 121, 131 and/or 141, etc. the device may be capable of connecting with a non-resident's device (e.g., telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different, network as network 150. Telephony switches 128, 138, 148 etc. in respective communication processing system 121, 131, 141, etc. may be used to connect calls across a PSTN (i.e. network 170), such as calls from controlled-environment facility telephone 113, 123 or 133 and non-resident telephone 163, which, in accordance with embodiments of the present systems and methods, may also be camera-enabled. Telephony router 129, 139, 149, etc., media gateway functionality, or the like of respective communication system 121, 131, 141, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect controlled-environment facility 110, 120, 130, etc., itself.

Centralized investigative data aggregation and analysis system 190 may provide investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information.

Embodiments of the present systems and methods may be employed in the above-described environment, such as in a manner described below, with respect to FIG. 2, a flowchart of example process 200 for handling non-resident initiated communications with controlled-environment facility residents, in accordance with some embodiments.

Therein, in accordance with some embodiments of the present systems and methods, a controlled-environment facility communication processing system (121, 131, 141), or the like, may present, at 202, a web interface on a non-resident's (communications) device (164, 165, 166), or the like, for use by the non-resident to initiate a communication with a controlled-environment facility resident. In accordance with such embodiments an incoming communication request may be received at 204, from the non-resident to initiate the communication with the controlled-environment facility resident, such as for receipt by the controlled-environment facility communication processing system (at 212, below). In accordance with embodiments of the present systems and methods, the incoming communication request received at 204, may be directed to a telephone number assigned to a controlled-environment facility resident and/or assigned to a controlled-environment facility media and/or communications device associated with the controlled-environment facility resident.

As noted above, controlled-environment facility communication processing systems (121, 131, 141), particularly when deployed in, and/or in conjunction with a controlled-environment facility communications provider data center (140) may be referred to as a "controlled-environment facility secure communication platform," or the like.

In accordance with, some (other) embodiments of the present systems and methods, the controlled-environment facility communication processing system (121, 131, 141), or the like, may provide an app for use by the non-resident on a non-resident communications device (164, 165, 166), or the like, at 206. At 208, a user interface may be presented, via the app, on the non-resident (communications) device for use by the non-resident. Also, in accordance with such embodiments, a communication request from the non-resident may be received, via the app, at 210, for the communication with the controlled-environment facility resident, such as directed to a telephone number assigned to a controlled-environment facility resident and/or a controlled-environment facility media and/or communications device associated with the controlled-environment facility resident, for receipt by the controlled-environment facility communication processing system (at 212, below).

At 212, a controlled-environment facility communication processing system (121, 131, 141) receives the incoming communication request from a non-resident for the communication with the controlled-environment facility resident, such as via the web interface, app user interface, via a direct dialed call (from a non-resident device (163, 164, 165, 166), which may be directed to a personal intelligent controlled-environment facility resident media and/or communications device (115, 125, 135), or the like.

At 214, the controlled-environment facility communication processing system (121, 131, 141) sends an event notice, or the like to the intelligent controlled-environment facility media and/or communications device or terminal (114, 115, 124, 125, 134,135) associated with the controlled-environment facility resident, in response to such receipt of the incoming communication request at 212. In accordance with embodiments of the present systems and methods, the resident's intelligent controlled-environment facility media and/or communications device or terminal may be: an intelligent controlled-environment facility resident media and/or communications device (115, 125, 135) assigned to, or otherwise associated with the controlled-environment facility resident, to whom the communication request is directed; a communal, or otherwise shared intelligent controlled-environment facility media and/or communications terminal (114, 124, 134) that the controlled-environment facility resident, to whom the communication request is directed, has signed onto; or the like. Also, in accordance with various embodiments of the present systems and methods, the event notice issued at 214 may result in (i.e. be assigned, prompt the playing of, execute, implement or otherwise employ) a telephone ring alert on the intelligent controlled-environment facility media and/or communications device or terminal.

An option to accept the event notice may be presented on the intelligent controlled-environment facility media and/or communications device or terminal (114, 115, 124, 125, 134,135) at 216. At 220, the controlled-environment facility communication processing system (121, 131, 141) connects an outgoing communication from the intelligent controlled-environment facility media and/or communications device or terminal to a communications device (163, 164, 165, 166) associated with the non-resident, such as, in response to acceptance of the event notice at 218.

Alternatively, and/or as part of accepting the incoming communications invitation at 218 and establishing a responsive outgoing controlled-environment facility resident to non-resident communication at 220, the intelligent controlled-environment facility media and/or communications device or terminal (114, 115, 124, 125, 134,135), may, in response to acceptance of the event notice, at 218, present, at 222, a phone dialer interface with a telephone number associated with the non-resident pre-filled (i.e. filled in) on the interface. In accordance with such embodiments, the outgoing communication (e.g., a voice call, text, e-message, or the like) from the intelligent controlled-environment facility media and/or communications device or terminal to the communications device (163, 164, 165, 166) associated with the non-resident, may be connected at 220 in response to an indication to dial the phone number, received via the phone dialer interface, at 224.

Likewise, accepting the incoming communications invitation at 218 or accepting an indication at 224 to dial the phone number displayed in the phone dialer interface at 222, and/or establishing the responsive outgoing controlled-environment facility resident to non-resident communication at 220 may require resident-user verification. To wit, the controlled-environment facility communication processing system (121, 131, 141) and/or the intelligent controlled-environment facility media and/or communications device or terminal (114, 115, 124, 125, 134,135) may require entry of identification information (such as a PIN, inmate number, password, and/or the like) or presentation of biometric input (such as a fingerprint, iris scan, image of the resident user, or the like) by the controlled-environment facility resident. This may be provided via the intelligent controlled-environment facility media and/or communications device or terminal (phone dialer interface), prior to connecting the outgoing communication from the intelligent controlled-environment facility media and/or communications device or terminal to the communications device associated with the non-resident at 220.

If the non-resident initiated the incoming communication (request) via a webpage (at 204), via a personal wireless communications device (e.g., smartphone, tablet computer, media player, or the like) app (at 210) or by calling a number assigned to the resident and/or the resident's intelligent controlled-environment facility resident media and/or communications device, the call back at 220 may result in a ring on this webpage, personal wireless communications device (app) or telephone.

Embodiments of the present systems and methods for non-resident initiated communications with controlled-environment facility residents, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as, or as part of, one or more of: controlled environment facility communications management systems 121, 131 and/or 141 and thereby the aforementioned controlled-environment facility secure communication platform; AMSs 112, 122 and 132; centralized investigative data aggregation and analysis system 190; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via a network. For example, in FIG. 1, centralized investigative data aggregation and analysis system 190 is illustrated as communicating with controlled-environment facility communications management systems 121, 131 and 140, via public network 170, which may be the Internet, or the like, as discussed above. Further, users of the present investigative data aggregation and analysis system may communicate therewith via public network 170 (e.g., the Internet) or the like. Likewise, as another example, devices 125 and 135 may communicate with respective controlled-environment facility management systems 121 and 131, such as via a local area network, and/or using wireless functionality.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 through 3. Program instructions 325 may be implemented in various embodiments using any desired programming language, scripting language, or combination of programming languages and/or scripting languages (e.g., C, C++, C #, JAVA®, JAVASCRIPT®, PERL®, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for initiating communication with a controlled-environment facility resident by a non-resident comprising:

a controlled-environment facility secure communication platform comprising at least one processor and a memory configured to store program instructions that upon execution by the at least one processor cause the controlled-environment facility secure communication platform to:

receive an incoming communication request from a non-resident, directed to a telephone number assigned to a controlled-environment facility resident and/or a controlled-environment facility media and/or communications device associated with the controlled-environment facility resident, for a communication with the controlled-environment facility resident; and send an event notice to the controlled-environment facility media and/or communications device associated with the controlled-environment facility resident or a controlled-environment facility media and/or communications terminal associated with the controlled-environment facility resident, in response to receipt of the incoming communication request;

the controlled-environment facility media and/or communications device or terminal comprising at least one processor and a memory configured to store program instructions that upon execution by the at least one processor cause the controlled-environment facility media and/or communications device or terminal to:

present an option to accept the event notice; and present, in response to acceptance of the event notice, a phone dialer interface with a telephone number associated with the non-resident pre-filled on the interface on the controlled-environment facility media and/or communications device or terminal; and the respective program instructions upon execution by the respective at least one processor cause the controlled-environment facility secure communication platform and/or controlled-environment facility media and/or communications device or terminal to connect an outgoing communication from the controlled-environment facility media and/or communications device or terminal to a device associated with the non-resident, in response to an indication to dial the telephone number, received via the phone dialer interface.

2. The system of claim 1, wherein the controlled-environment facility secure communication platform program instructions upon execution by the at least one processor of the controlled-environment facility secure communication platform further cause the controlled-environment facility secure communication platform to:

provide a web interface on the non-resident device for use by the non-resident; and accept, via the web interface, the incoming communication request from the non-resident for the communication with the controlled-environment facility resident, for receipt by the controlled-environment facility secure communication platform.

3. The system of claim 1, wherein the controlled-environment facility secure communication platform program instructions upon execution by the at least one processor of the controlled-environment facility secure communication platform further cause the controlled-environment facility secure communication platform to:

provide an application program for use by the non-resident on a non-resident device;

present, via the application program, a user interface on the non-resident device for use by the non-resident; and accept, via the user interface, the incoming communication request from the non-resident for the communication with the controlled-environment facility resident, for receipt by the controlled-environment facility secure communication platform.

4. The system of claim 1, wherein the controlled-environment facility media and/or communications device or terminal is a controlled-environment facility resident media and/or communications device associated with the controlled-environment facility resident.

5. The system of claim 1, wherein the controlled-environment facility media and/or communications device or terminal is a controlled-environment facility media and/or communications terminal that the controlled-environment facility resident has signed onto.

6. The system of claim 1, wherein the event notice prompts playing of a telephone ring alert on the controlled-environment facility media and/or communications device or terminal.

7. The system of claim 1, wherein the respective program instructions upon execution by the respective at least one processor, cause the controlled-environment facility secure communication platform and/or controlled-environment facility media and/or communications device or terminal to require identification information from the controlled-environment facility resident, prior to connecting the outgoing communication from the controlled-environment facility media and/or communications device or terminal to the device associated with the non-resident.

8. A method for non-resident initiated communication with a controlled-environment facility resident comprising:

receiving, by a controlled-environment facility secure communication platform, an incoming communication request from a non-resident, directed to a telephone number assigned to a controlled-environment facility resident and/or a controlled-environment facility media and/or communications device associated with the controlled-environment facility resident, for a communication with a controlled-environment facility resident;

sending an event notice, by the controlled-environment facility secure communication platform, to the controlled-environment facility media and/or communications device associated with the controlled-environment facility resident or a controlled-environment facility media and/or communications terminal associated with the controlled-environment facility resident, in response to receipt of the incoming communication request;

presenting, on the controlled-environment facility media and/or communications device or terminal, an option to accept the event notice;

presenting, on the controlled-environment facility media and/or communications device or terminal, in response to acceptance of the event notice, a phone dialer interface with a telephone number associated with the non-resident pre-filled on the interface; and connecting, by the a controlled-environment facility secure communication platform, an outgoing communication from the controlled-environment facility media and/or communications device or terminal to a device associated with the non-resident, in response to an indication to dial the telephone number, received via the phone dialer interface.

9. The method of claim 8, further comprising:

providing, by the controlled-environment facility secure communication platform, a web interface on a non-resident device for use by the non-resident; and accepting, via the web interface, the incoming communication request from the non-resident for the communication with the controlled-environment facility resident, for receipt by the controlled-environment facility secure communication platform.

10. The method of claim 8, further comprising:

providing, by the controlled-environment facility secure communication platform, an application program for use by the non-resident on a non-resident device;

presenting, via the application program, a user interface on the non-resident device for use by the non-resident; and accepting, via the user interface, the incoming communication request from the non-resident for the communication with the controlled-environment facility resident, for receipt by the controlled-environment facility secure communication platform.

11. The method of claim 8, wherein the controlled-environment facility media and/or communications device or terminal associated with the controlled-environment facility resident is a controlled-environment facility resident media and/or communications device associated with the controlled-environment facility resident.

12. The method of claim 8, wherein the controlled-environment facility media and/or communications device or terminal associated with the controlled-environment facility resident is a controlled-environment facility media and/or communications terminal that the controlled-environment facility resident has signed onto.

13. The method of claim 8, further comprising the event notice prompting playing of a telephone ring alert on the controlled-environment facility media and/or communications device or terminal.

14. The method of claim 8, further comprising requiring identification information from the controlled-environment facility resident prior to connecting the outgoing communication from the controlled-environment facility media and/or communications device or terminal to the device associated with the non-resident.

15. A computer readable non-transitory medium having program instructions stored thereon that upon execution by a controlled-environment facility secure communication platform and/or a controlled-environment facility media and/or communications device or terminal cause the controlled-environment facility secure communication platform and/or controlled-environment facility media and/or communications device or terminal to:
   receive an incoming communication request from a non-resident for a communication with a controlled-environment facility resident, directed to a telephone number assigned to a controlled-environment facility resident and/or a controlled-environment facility media and/or communications device associated with the controlled-environment facility resident;
   present an event notice on the controlled-environment facility media and/or communications device or terminal, in response to receipt of the incoming communication request;
   present an option, on the controlled-environment facility media and/or communications device or terminal, to accept the event notice;
   present, in response to acceptance of the event notice, a phone dialer interface with a telephone number associated with the non-resident pre-filled on the interface, on the controlled-environment facility media and/or communications device or terminal; and
   connect an outgoing communication from the controlled-environment facility media and/or communications device or terminal to a device associated with the non-resident, in response to an indication to dial the telephone number, received via the phone dialer interface.

16. The computer readable non-transitory medium of claim 15 having program instructions stored thereon that upon execution by the controlled-environment facility secure communication platform further cause the controlled-environment facility secure communication platform to:
   provide a web interface on the non-resident device for use by the non-resident; and
   accept, via the web interface, the incoming communication request from the non-resident for the communication with the controlled-environment facility resident, for receipt by the controlled-environment facility secure communication platform.

17. The computer readable non-transitory medium of claim 15 having program instructions stored thereon that upon execution by the controlled-environment facility secure communication platform further cause the controlled-environment facility secure communication platform to:
   provide an application program for use by the non-resident on a non-resident device;
   present, via the application program, a user interface on the non-resident device for use by the non-resident; and
   accept, via the user interface, the incoming communication request from the non-resident for the communication with the controlled-environment facility resident, for receipt by the controlled-environment facility secure communication platform.

\* \* \* \* \*